Patented Oct. 24, 1922.

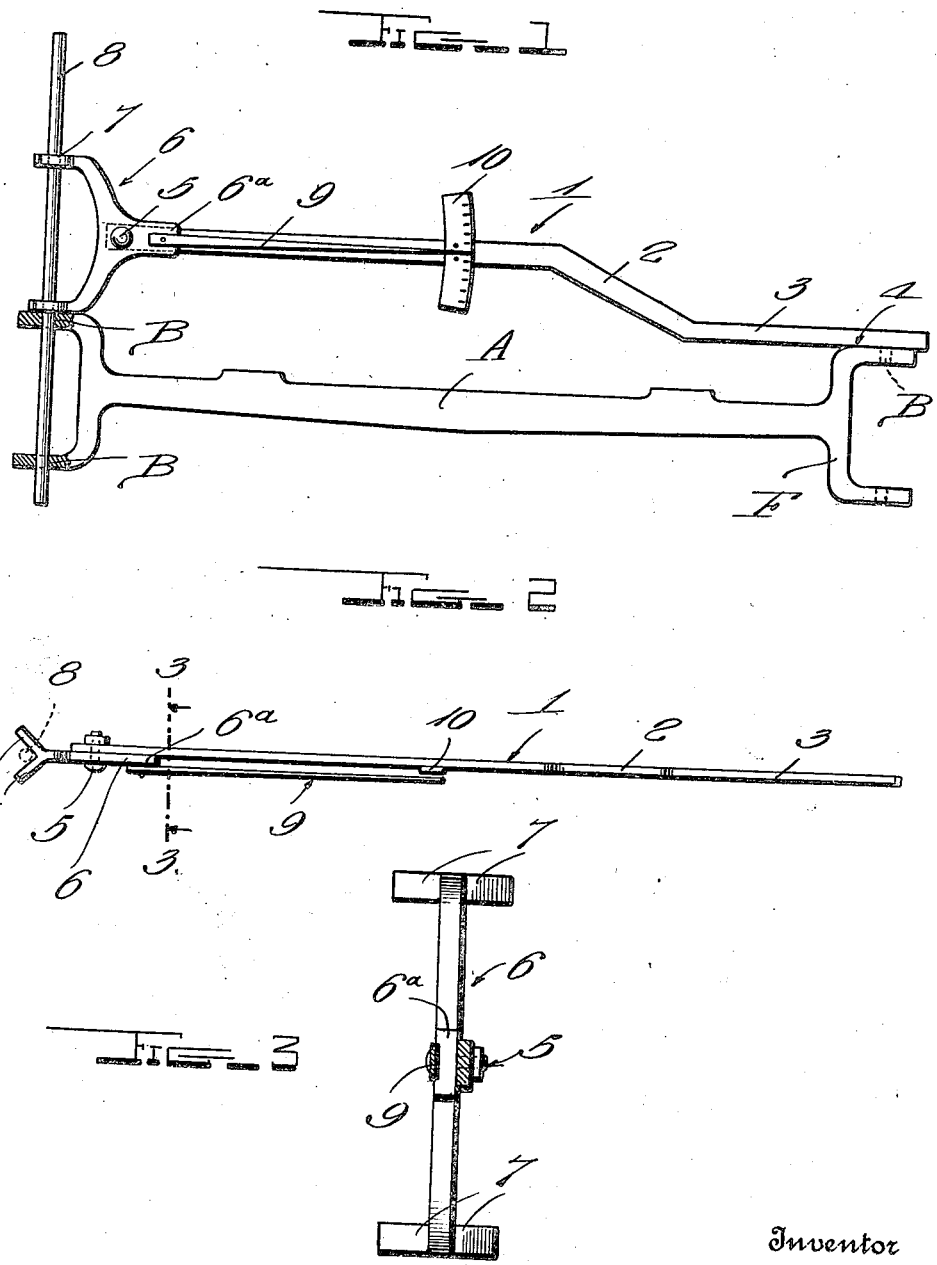

1,433,064

UNITED STATES PATENT OFFICE.

GEORGE E. BROWER, OF HUTCHINSON, KANSAS.

AXLE GAUGE.

Application filed January 20, 1921. Serial No. 438,725.

*To all whom it may concern:*

Be it known that I, GEORGE E. BROWER, a citizen of the United States, residing at Hutchinson, in the county of Reno and State of Kansas, have invented certain new and useful Improvements in Axle Gauges; and I do declare the following to be a full, clear, and exact description of the invention, such as will enable others skilled in the art to which it appertains to make and use the same.

This invention relates to an improved axle gauge which is especially, although not necessarily, designed for use in connection with automobile axles.

The principal object of the invention is to produce a device of this class which is such in construction as to render it practical and to insure accurate setting of a vehicle axle, the construction being such as to enable the desired bend to be given the axle, to be ascertained so that the arms of one of the end-forks can be properly and accurately aligned with respect to the corresponding arms of the other end-fork.

Another object of the invention is to generally improve upon prior devices of this class by providing one of extreme simplicity and durability, which is accurate, easy to handle, and comparatively inexpensive to both the manufacturer and the user.

Other objects and advantages of the invention will be apparent during the course of the following description.

In the accompanying drawings forming a part of this specification and in which like numerals are employed to designate like parts throughout the same:

Figure 1 is an elevational view of a gauge constructed in accordance with my invention, showing the manner in which the same is used.

Figure 2 is a top plan view thereof.

Figure 3 is an enlarged sectional view taken on the plane of the line 3—3 of Fig. 2.

In carrying out the invention, I make use of a comparatively flat relatively long metal bar 1 which is bent laterally near its center as indicated at 2 and is then bent to extend in parallelism with the body portion as indicated at 3, the under face of this portion 3 being flat as designated at 4 and designed to bear on the upper flat face of one of the arms B of the forks F of a conventional type of automobile axle A. Pivoted at 5 on the opposite end of the bar is a body, preferably in the form of a yoke 6, the arms thereof being bent into parallelism with one another as shown for the same purpose set forth for the bearing surface 4. To enable the device to be easily handled by a single person and held against undue movement when gaging the axle, I provide the arms of the yoke at their free ends with diverging prongs 7 which form seats adapted to receive a stop pin or abutment 8 placed in the bearing openings of the arms of the forks F at this end of the axle. The yoke carries a central extension 6$^a$ and secured on this extension is a pointer 9 which, as is obvious, is designed to co-operate with the vertically disposed transversely extending scale 10.

Assuming that the axle A has been bent in such a way as to throw the bearing forks F out of alignment with one another and also assuming that they have been bent, by suitable means, to their original position so far as can be determined by the eye, it will be seen that by placing the gauge on the upper arms of the forks in the manner disclosed in Fig. 1, an accurate setting of the bearing forks may be obtained. As before stated, I place an abutment pin 8 in bearing openings of the left hand fork and this pin is received between the prongs 7 and thus serves to prevent slipping or accidental displacement of the adjacent end of the gauge. If the arms of one of the end forks are not in true horizontal alignment with the corresponding arms of the other end-fork, relative movement of the head 6 and bar 1 will bring the indicator and scale into action so as to enable the mechanic, with the aid of these parts, to straighten the axle and accurately place the bearing forks in their proper relative positions. At this point, I wish to state that while I have shown and described a particular type of axle with which the gauge is used, I desire it to be understood that the gauge can also be used with other types of automobile axles.

The manner of using the gauge is thought to have been made apparent from the foregoing description and drawing. This being the case, it is thought unnecessary to insert a more lengthy description thereof.

Since probably the best results may be obtained with the construction and arrangement herein shown and described, this construction and arrangement is taken as the preferred embodiment of the invention. However, I wish it to be understood that various minor changes in the shape, size, and arrangement of parts may be resorted to without departing from the spirit of the invention or the scope of the subjoined claims.

I claim:

1. An axle gauge comprising a bar, one end of which is designed to engage one of the arms of one of the end-forks of a vehicle axle, a yoke-shaped body pivoted on the opposite end of the bar, one of the arms of said body being adapted for engagement with one of the arms of the other end-fork of the axle, the arms of said body being equipped with seats for reception of a stop pin which is adapted to be placed in the bearing openings in the arms of said last named end-fork, a scale on the intermediate portion of said bar, and a pointer carried by said body for co-operation with said scale.

2. An axle gauge comprising a bar having a flat surface at one end for engagement with the upper flat face of the upper arm of one of the end forks of an axle, a vertically disposed body pivoted to the opposite end of the bar and having contact faces, one for engagement with the flat face of the other upper arm of the remaining fork and one for engaging a stop pin designed to be placed in the spindle bearing openings in the arms of said last named fork, a transverse scale on the intermediate portion of the bar, and a pointer carried by the body and co-operative with the scale.

3. The structure set forth in claim 2, said body being yoke-shaped and the arms thereof having diverging prongs at their free ends between which the aforesaid stop pin is received.

4. An axle gauge comprising a flat bar bent laterally and then parallel with respect to the body portion at one of its ends to offset this end, said offset end having a flat contact surface for engagement with the flat surface of the upper arm of the adjacent end-fork of an axle, a vertically disposed yoke-shaped body pivoted to the opposite end of said bar, the extremities of the laterally directed ends of the arms of said yoke being formed with diverging prongs forming seats, the lower flat face of the lower arm of the yoke being in true horizontal alignment with the aforesaid contact face at the other end of the bar, a pin for passage through the spindle bearing holes in the arms of the other end-fork, being receivable in said seats, a vertically disposed transversely extending scale on the intermediate portion of the bar, and a pointer carried by said yoke for co-operation with the scale.

5. An axle gauge comprising a bar having a flat surface at one end which is designed to engage a flat surface on the upper arm of one of the end-forks of a vehicle axle, a body pivoted on the opposite end of the bar, said body having a flat surface for engagement with the corresponding surface of one of the arms of the remaining end-fork of the axle, said body being also provided with seats, a stop pin designed to be inserted in the spindle bearing openings in the arm of said end-fork, said pin being designed for reception in the aforesaid seats, a scale on the intermediate portion of the bar, and a pointer carried by said body for co-action with the scale.

In testimony whereof I have hereunto set my hand.

GEORGE E. BROWER.